(12) United States Patent
Wouda et al.

(10) Patent No.: US 11,822,462 B2
(45) Date of Patent: Nov. 21, 2023

(54) GENERATION OF CODE COVERAGE INFORMATION DURING TESTING OF A CODE SEQUENCE

(71) Applicant: Arm Limited, Cambridge (GB)

(72) Inventors: Sanne Wouda, Cambridge (GB); Robert James Catherall, Cambridge (GB)

(73) Assignee: Arm Limited, Cambridge (GB)

( * ) Notice: Subject to any disclaimer, the term of this patent is extended or adjusted under 35 U.S.C. 154(b) by 83 days.

(21) Appl. No.: 17/265,318

(22) PCT Filed: Jul. 5, 2019

(86) PCT No.: PCT/GB2019/051905
§ 371 (c)(1),
(2) Date: Feb. 2, 2021

(87) PCT Pub. No.: WO2020/053545
PCT Pub. Date: Mar. 19, 2020

(65) Prior Publication Data
US 2021/0318946 A1  Oct. 14, 2021

(30) Foreign Application Priority Data

Sep. 14, 2018  (GB) ...................................... 1814963

(51) Int. Cl.
*G06F 11/00* (2006.01)
*G06F 11/36* (2006.01)
*G06F 11/263* (2006.01)

(52) U.S. Cl.
CPC ...... *G06F 11/3676* (2013.01); *G06F 11/2635* (2013.01); *G06F 11/3644* (2013.01); *G06F 11/3688* (2013.01); *G06F 11/3692* (2013.01)

(58) Field of Classification Search
CPC .................................................. G06F 11/2635
See application file for complete search history.

(56) References Cited

U.S. PATENT DOCUMENTS

| 5,805,795 A | * | 9/1998 | Whitten ............... G06F 11/3672 714/E11.208 |
| 2005/0273666 A1 | | 12/2005 | Ioku et al. |
| 2018/0081782 A1 | * | 3/2018 | Fulton ................. G06F 11/3676 |

FOREIGN PATENT DOCUMENTS

CN          102323906          1/2012

OTHER PUBLICATIONS

International Search Report and Written Opinion of the ISA for PCT/GB2019/051905, dated Oct. 8, 2019, 15 pages.
(Continued)

*Primary Examiner* — Lewis A Bullock, Jr.
*Assistant Examiner* — Mohammad H Kabir
(74) *Attorney, Agent, or Firm* — NIXON & VANDERHYE P.C.

(57) ABSTRACT

A method and computer program for generating code coverage information during testing of a code sequence are described, in which the code sequence comprises decisions, each having one or more conditions as inputs. The method includes executing the code sequence on target processing circuitry under the control of test stimuli and maintaining, in memory, a code coverage table for at least one decision. When a decision is evaluated, a bitstring is created within a storage element, each position in the bitstring being associated with one of the conditions and the value in that position representing the value of that condition used in evaluating the decision. The bitstring is used to identify the entry, in the code coverage table associated with the evaluated decision, for that combination of values of the conditions, and a confirmation value is recorded in that entry, indicating that the decision has been evaluated for that entry.

23 Claims, 12 Drawing Sheets

(56) References Cited

OTHER PUBLICATIONS

Combined Search and Examination Report for GB1814963.3, dated Mar. 25, 2019, 5 pages.

* cited by examiner

Decision : (A && B) || C

|   | Observed? (86) | Result (88) |
|---|---|---|
| 0 | 0/1 | 0(if observed) |
| 1 | 0/1 | 1(if observed) |
| 2 | 0 | 0 |
| 3 | 0 | 0 |
| 4 | 0/1 | 0(if observed) |
| 5 | 0/1 | 1(if observed) |
| 6 | 0/1 | 1(if observed) |
| 7 | 0 | 0 |

FIG. 7

Decision : (A && B) || C

| | Observed? | Result |
|---|---|---|
| 0 | 1 | 0 |
| 1 | 1 | 1 |
| 2 | 0 | 0 |
| 3 | 0 | 0 |
| 4 | 1 | 0 |
| 5 | 0 | 0 |
| 6 | 1 | 1 |
| 7 | 0 | 0 | pair : C shown to independently affect result of decision pair : A shown to independently affect result of decision pair : B shown to independently affect result of decision => MC/DC code coverage criterion satified

FIG. 8

Decision : (A && B) || C

| | Observed? | Result |
|---|---|---|
| 0 | 1 | 0 |
| 1 | 1 | 1 |
| 2 | 0 | 0 |
| 3 | 0 | 0 |
| 4 | 1 | 0 |
| 5 | 1 | 1 |
| 6 | 0 | 0 |
| 7 | 0 | 0 | pair : C shown to independently affect result of decision

No pairs for A and B

=> MC/DC code coverage criterion not shown to be satified

FIG. 9

| Observed? | Result | Conditions taking default value? |
|---|---|---|
| | | |

FIG. 10

Decision : (A && B) || C

| | Observed? | Result | Conditions taking default value | |
|---|---|---|---|---|
| FXF → | 1 | 0 | 010 | 0 |
| FXT → | 1 | 1 | 010 | 1 |
| | 0 | 0 | 000 | 2 |
| | 0 | 0 | 000 | 3 |
| TFF → | 1 | 0 | 000 | 4 |
| TFT → | 1 | 1 | 000 | 5 |
| TTX → | 1 | 1 | 001 | 6 |
| | 0 | 0 | 000 | 7 |

FIG. 11

GENERATION OF CODE COVERAGE INFORMATION DURING TESTING OF A CODE SEQUENCE

This application is the U.S. national phase of International Application No. PCT/GB2019/051905 filed 5 Jul. 2019, which designated the U.S. and claims priority to GB Patent Application No. 1814963.3 filed 14 Sep. 2018, the entire contents of each of which are hereby incorporated by reference.

The present technique relates to the evaluation of code coverage in software testing.

It is often useful for software developers to test sequences of code by applying a selection of test stimuli and observing or recording how the code responds to these stimuli. This is particularly useful for safety critical systems such as in vehicles or medical devices. For example, a software developer may wish to test how a car will respond if the brake pedal is pressed, or if an obstacle appears in the road ahead.

When testing code, various code coverage criteria can be used to determine how thorough the particular test suite used is. In safety critical systems, it may be a requirement to demonstrate that certain criteria have been fulfilled in testing the code. One example of a set of code coverage criteria is Modified Condition/Decision Coverage (MC/DC). MC/DC refers to decisions and conditions, where a decision is a Boolean expression composed of conditions and Boolean operators (e.g. the decision A||B, where || means OR and A and B are conditions). MC/DC requires that the following four criteria are satisfied when testing a sequence of code:
  i) Each entry and exit point is invoked;
  ii) Each decision takes every possible outcome;
  iii) Each condition in a decision takes every possible outcome;
  iv) Each condition in a decision is shown to independently affect the outcome of the decision.

In practice, the fourth condition, which requires the tester to demonstrate that changing any one of the conditions causes the overall outcome to change, is the hardest to test. According to the DO-178C Standard definition of MC/DC, a condition is shown to independently affect a decision's outcome either by: (1) varying just that condition while holding all other possible conditions fixed, or (2) varying just that condition while holding fixed all other possible conditions that could affect the outcome. For example, in the decision A|| B, the fourth condition of MC/DC can be satisfied by testing the following combinations of values of A and B, where a value of 1 represents that a condition has been evaluated to be "true" and a value of 0 represents that a condition has been evaluated to be "false":

| A | B | Result |
|---|---|--------|
| 0 | 0 | 0 |
| 0 | 1 | 1 |
| 1 | — | 1 |

In the above example, the first two entries show B independently affecting the result of the decision, since between these entries only the state of condition B has been changed, but this has led to a change in the result. Similarly, the first and third entries show an example of A independently affecting the result of the calculation, since A is the only condition to have changed between these two entries, and this has caused the result to change. It should be noted that in the third entry, B is unknown due to short-circuiting (discussed below), but cannot affect the outcome of the result. Thus, B can be assumed to take the value "0" for the purposes of MC/DC testing. Accordingly, the fourth criterion for MC/DC code coverage has been satisfied in this example, even without testing all possible combinations of A and B (the combination A=B=1 has not been tested in the above example). It should be noted that a test that is sufficient to satisfy the fourth condition of MC/DC code coverage is not necessarily sufficient to cover the other three conditions.

However, demonstrating that this criterion has been satisfied in a test of a sequence of code can be difficult. In some conventional systems, the fourth criterion of MC/DC is demonstrated by capturing an execution trace during execution of the software to be tested, and the trace is output by the processing system. The trace can then be analysed to determine whether the MC/DC criteria have been satisfied. However, this approach is highly inefficient, since—especially in real-world scenarios where large test suites may need to be executed—the trace can become difficult to collect in full and involves the output of a lot of information off-chip to allow off-chip analysis, requiring significant bandwidth which can be difficult or inefficient to maintain. Alternatively, in the case of a simulation model, it may be necessary to process this large volume of information on the fly, which can significantly impact the performance of the model. Furthermore, merely collecting information about which outcomes have been seen for different conditions is insufficient for demonstrating that the fourth criterion of MC/DC has been satisfied, since doing so does not necessarily allow a tester to see which combinations of conditions have been seen in a single instance of the decision.

The present technique aims to address such problems.

Viewed from a first aspect, there is provided a method of generating code coverage information during testing of a code sequence, wherein during execution of the code sequence one or more decisions are evaluated in order to determine one or more decision results, where each decision has as inputs one or more conditions, the method comprising:
  executing the code sequence on target processing circuitry under the control of test stimuli, during which the target processing circuitry is caused to maintain in memory, for at least one decision, an associated code coverage table to store the code coverage information for that decision, where each code coverage table has an entry associated with each possible combination of values of the one or more conditions used as inputs when evaluating the associated decision;
  each time a decision with an associated code coverage table is evaluated during execution of the code sequence, further causing the target processing circuitry to:
    create within a storage element a bitstring, where each position in the bitstring is associated with a specific one of the conditions used as an input for the decision, and the value at each position in the bitstring identifies the value of the associated condition used in evaluating the decision;
    use the bitstring as an index to the associated code coverage table to identify an entry in the table; and
    record, in that entry, a confirmation value to indicate that the decision has been evaluated for the combination of values of the one or more conditions associated with that entry.

Viewed from a second aspect, there is provided a computer program product providing a compiler program which when executed on a computer is arranged to process an input code sequence with reference to instrumentation rules in order to generate an instrumented code sequence for use in the method above, further comprising generating, as the code sequence to be executed, an instrumented code sequence by inserting into an original code sequence instructions to cause the target processing circuitry to perform the create, use and record steps of the method discussed above.

Viewed from a third aspect, there is provided a code coverage analysis apparatus comprising:
  an interface to receive at least one code coverage table produced using the method described above when testing a code sequence; and
  evaluation circuitry to evaluate each received code coverage table to determine whether the testing of the code sequence complies with at least one MC/DC code coverage criterion for an associated decision.

Viewed from a fourth aspect there is provided a computer program product providing a code coverage analysis program which when executed on a computer is arranged to:
  process at least one code coverage table produced using the method described above when testing a code sequence; and
  evaluate each received code coverage table to determine whether the testing of the code sequence complies with at least one MC/DC code coverage criterion for an associated decision.

Further aspects, features and advantages of the present technique will be apparent from the following description of examples, which is to be read in conjunction with the accompanying drawings, in which:

FIGS. 7 to 11 show examples of code coverage tables according to some examples of the present technique.

Figure 1:
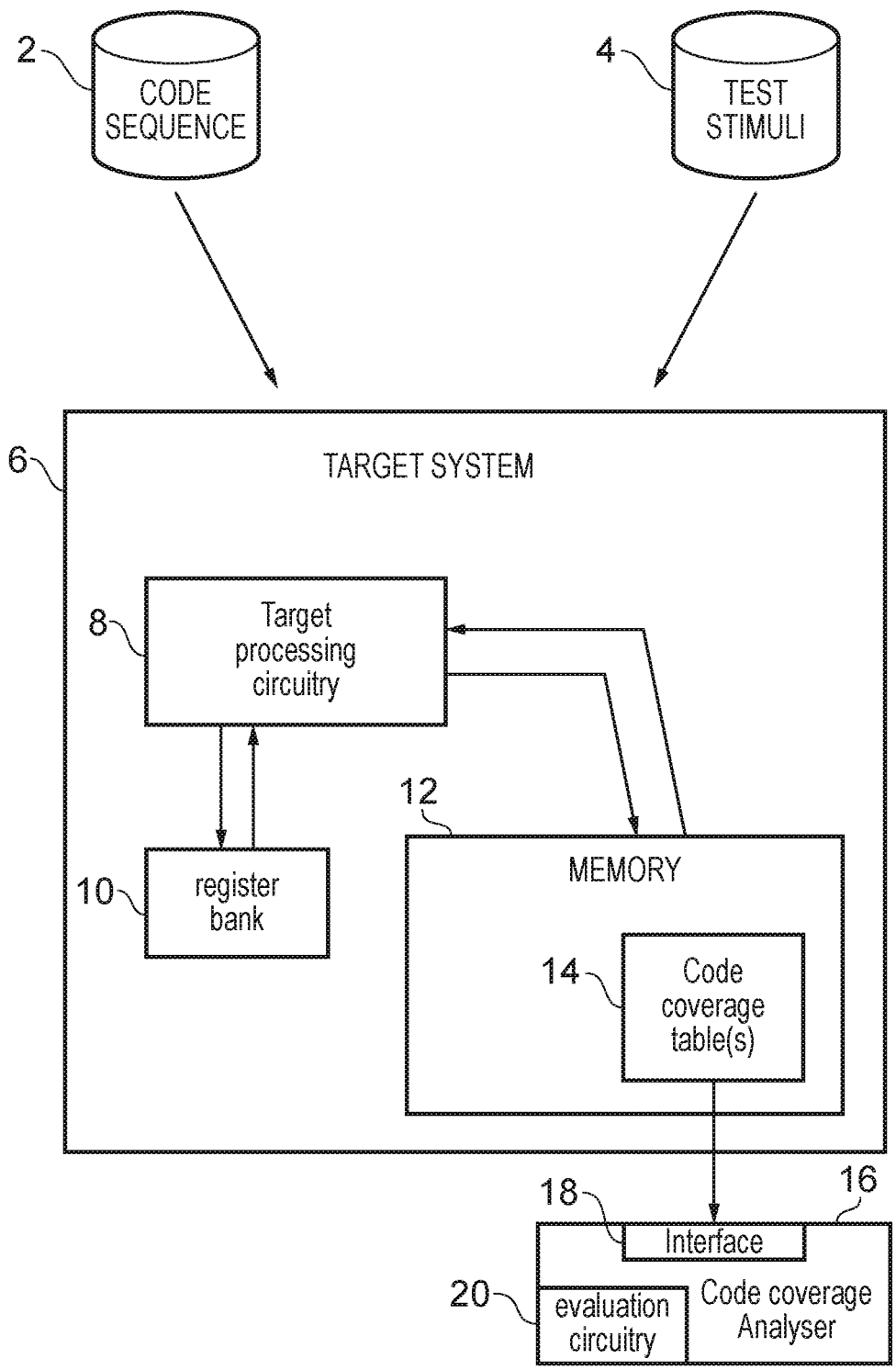
FIG. 1 shows an example of a system with which the present technique may be implemented.

In accordance with one example configuration there is provided a method of generating code coverage information on a target processing system (e.g. the system on which it is intended that the code sequence will be executed under normal operation) while testing a sequence of code. During execution of the code sequence, one or more decisions are evaluated, the decisions being Boolean expressions composed of one or more conditions (input values) and one or more Boolean operators (e.g. AND, OR, etc.). Conditions and decisions can be either true (logic 1) or false (logic 0). The code coverage information is generated by executing the code sequence on target processing circuitry under the control of one or more test stimuli. During execution of the code sequence, the target processing circuitry maintains, in memory, a code coverage table for at least one decision, the code coverage table having an entry associated with each possible combination of values of the one or more conditions used as inputs in the evaluation of that decision. Each time a decision with an associated code coverage table is evaluated, the target processing circuitry creates a bitstring (bitfield) in which each position is associated with one of the conditions used to evaluate the decision, and the value at that position indicates the value of the condition used. For example, if the conditions A=True and B=False are input into a decision, the bitstring generated could be (1 0), where the bit in position 0 of the bitstring (the left-most bit) is associated with condition A and the bit in position 1 (the right-most bit) is associated with condition B. The bitstring is generated within a storage element, which can be a register of a register bank or any other form of data storage, and is used as an index to the associated code coverage table to identify an entry in that table. Once the relevant entry is located, a confirmation value is recorded to that entry to indicate that the decision has been evaluated for that particular combination of values of the conditions.

It should be noted that, while in the examples given position 0 in the bitstring is considered to be the left-most bit, it is equally possible for position 0 to be the right-most bit.

The present technique therefore allows code coverage information—for example, a code coverage table for one or more decisions—to be generated on the target processing system, so that only the relevant information (e.g. the code coverage tables, rather than an entire trace) are captured for use in evaluating code coverage. This approach can be applied to any sequence of code comprising at least one decision, and improves the efficiency of the system since a full trace does not need to captured and output for analysis, which can be difficult to achieve, especially in real-world scenarios for which large test suites may be needed. Analysis of compliance with code coverage criteria can then be carried out efficiently outside of the target system using the generated code coverage table or tables. According to the present technique, code coverage information can therefore be generated and processed in an efficient manner, and can be easily analysed to determine compliance with code coverage criteria.

In one example implementation, when one of the conditions does not affect the result of the decision, given the value of at least one other condition used in evaluating the decision, a default value is given to that condition when evaluating the decision. Hence, for some combinations of condition values, an actual value does not need to be observed for one or more conditions before the decision can be evaluated. In one particular example, the default value is a logic zero value.

In some examples, once the testing of the code sequence has completed, the code coverage tables generated by the processing circuitry are output for use in evaluating code coverage.

By outputting the code coverage tables, the present technique allows the relevant information for evaluating code coverage to be made available to a user or to a piece of software/hardware for analysing code coverage in an efficient way, without an entire trace being captured and output. The code coverage tables are also formatted such that code coverage compliance can be easily determined, reducing the amount of post-processing required and increasing the efficiency of the overall system. In this way, not only is the efficiency of the target system improved, but so is the efficiency of any external code coverage analyser that may be used to evaluate compliance with code coverage criteria.

Furthermore, the accuracy of the evaluation of code coverage compliance is also improved by this technique, since there is a high risk of programming errors in conventional systems due to the complexity of decoding and analysing a trace. The processing of the output code coverage tables of the present technique, however, is less error-prone and thus more reliable.

In some examples, the code sequence to be tested is augmented with instructions to cause the processing circuitry to carry out the additional steps described above (e.g. creating a bitstring, using the bitstring as an index and recording a confirmation value to the relevant entry in the table). This instrumented (augmented or annotated) code sequence is then used as the code sequence to be executed by the target processing circuitry.

Instrumenting the code sequence to be tested with additional instructions as described above allows code coverage information to be generated for different code sequences without needing significant adaptation to the hardware. This approach also improves the efficiency of the system, by enabling a test of the code sequence to be carried out using a single instrumented code sequence.

In some examples, instructions to create, in memory, the code coverage table for the at least one decision are executed by the target processing circuitry.

These instructions may be part of the instrumented code sequence described above, or may be separate instructions executed before the code sequence or the instrumented code sequence is run. The code coverage table can then be populated according to the examples given above, in order to efficiently determine code coverage compliance.

In some examples, each entry in each code coverage table includes a first field for storing an indication of whether or not the associated decision has been evaluated for the combination of values of conditions associated with that entry. The indication is initially set to a first value (for example, but not necessarily, logic 0) and, when the entry is accessed by the target processing circuitry using the bitstring, the indication is set to a confirmation value different to the first value (e.g. logic 1).

Accordingly, an efficient technique is provided for populating a code coverage table which can be used to determine whether a code coverage criterion is satisfied.

In some examples, the generated code coverage tables also include a second field to store the result of the associated decision when evaluated for the combination of conditions associated with that entry.

This allows code coverage compliance to be more simply and efficiently determined, without the need for pre- or post-processing of the code coverage information to determine said results.

In some examples, the storage element in which the bitstring is generated is a register of a register bank accessible to the target processing circuitry during execution of instructions.

The code coverage criteria that are being assessed can take a variety of forms. However, in some examples, each code coverage table output by the target processing circuitry is evaluated to determine whether the testing of the code sequence complies with at least one MC/DC code coverage criterion for the associated decision.

The MC/DC code coverage criterion is, in some examples, defined according to the DO-178C Standard. Using the MC/DC code coverage criteria in combination with the technique of generating code coverage tables allows code to be efficiently and rigorously tested to a high standard.

In some examples, the MC/DC code coverage criterion tested is that each condition serving as an input to the associated decision has been shown to independently affect the outcome of that associated decision.

This can be shown in a number of ways; for example, for each condition in a decision, the fourth criterion of MC/DC can be shown to have been met by (1) varying just that condition while holding all other possible conditions fixed, or (2) varying just that condition while holding fixed all other possible conditions that could affect the outcome. The code coverage tables output by the target processing circuitry provide an indication of whether one of these requirements has been met, in order to efficiently allow a determination of whether this criterion of MC/DC code coverage is satisfied.

In some examples, compliance with the at least one MC/DC code coverage criterion is evaluated by determining whether each entry in the code coverage table for the associated decision stores the confirmation value in the first field.

This demonstrates whether or not all possible combinations of values of the conditions used in evaluating the decision have been tested, which provides an indication of whether or not the code coverage criterion is satisfied.

In some examples, if it is determined that every entry in the code coverage table for each of the decisions being tested stores the confirmation value, it is determined that the at least one MC/DC code coverage criterion has been satisfied.

If every entry in a code coverage table for a given decision stores the confirmation value, this shows that every combination of conditions has been tested for that decision, thus providing a useful indication that the code coverage criterion has been satisfied for the given decision.

In some examples, if it is determined that some entries in the code coverage table do not include the confirmation value, compliance with the MC/DC code coverage criterion is evaluated by seeking to identify, for each condition, at least one pair of entries that do contain the confirmation value. In each pair of entries, the value of the corresponding condition differs between the two, but the values of all other conditions that affect the result of the decision are held constant. For each pair of entries identified, it is then determined whether the decision result differs between them, and if the decision result does differ for at least one pair for each condition, it is determined that the at least one MC/DC code coverage criterion is satisfied for that decision.

In this way, compliance with an MC/DC code coverage criterion is efficiently determined without all combinations of conditions necessarily needing to be tested. This improves the efficiency of the system and avoids the need to re-test the code sequence to demonstrate code coverage.

There are a number of ways in which each candidate pair of entries can be identified. In one example implementation, the step of seeking to identify, for each condition, at least one pair of entries further comprises: for each entry including the confirmation value, determining if any of the one or more other conditions does not affect the result of the decision; and when considering a candidate pair of entries, ignoring the values of any condition that does not affect the result of the decision in at least one of the entries of the candidate pair.

In one example, the step of determining if any of the one or more conditions does not affect the result of the decision is performed with reference to knowledge of the decision. In particular, given knowledge of how the Boolean operators apply to the various conditions, it can be detected when one or more conditions do not affect the result of the decision.

However, in accordance with an alternative implementation, the table may further comprise a third field to store, in each entry, an indication of any condition that does not affect the result of the decision for that entry, and the step of determining if any of the one or more conditions does not affect the result of the decision is performed with reference to the third field of the table.

In some examples, where each entry in the code coverage table includes a second field for storing the result of the decision for the associated combination of conditions, it is determined whether the result of the decision differs between two entries in a pair by comparing the results stored in the second field.

Code coverage is therefore efficiently demonstrated for the decision without significant post-processing being required to determine the results of the decisions.

However, in an alternative implementation, the step of determining, for each pair of entries, whether the decision result of the associated decision differs includes evaluating the decision result of the associated decision for each of the pair of entries based on the corresponding bitstring, and then comparing the decision results for the pair of entries.

In accordance with one example configuration there is provided a computer program product providing a compiler program which, when executed on a computer, is arranged to process an input code sequence with reference to instrumentation rules in order to generate an instrumented code sequence for use in the methods described above.

In this way, the method of the present technique can be efficiently applied to any code sequence comprising at least one decision, by creating, from the code sequence, an instrumented code sequence to cause the target processing circuitry to perform the methods discussed above. In some examples, the instrumentation rules are implicit rules based on, for example, the constraints of the system or the requirements of the user. The instrumentation rules can be—but are not necessarily—specific rules input by a user.

In some examples the compiler program is also arranged to insert into the code sequence instructions to create in memory, for each of the at least one decision, the associated code coverage table for that decision.

In some examples, the computer program may also include a linker program arranged, when executed on a computer, to take the instrumented code sequence as an input, and provide an executable file based on the instrumented code sequence to the target processing circuitry.

In this way, the computer program according to the present technique can be implemented in a variety of different systems, and an executable file consistent with a given system can be generated accordingly.

In some examples, the compiler program or the linker program of the computer program product is arranged to provide an indication to the target processing circuitry that the instrumented code sequence has been instrumented, in response to which the associated code coverage table for a given decision is created in memory.

The indication could be in the form of meta-data describing the code-coverage tables required. On the target system, the operating system or other software loading mechanism is augmented to recognise the program as instrumented and create in memory, for each of the at least one decision, the associated code coverage table for that decision, on behalf of the program. The table may be generated by the CPU hardware of the target system; however, it is also possible that the tables are created by an operating system or test harness designed to load and execute tests.

In accordance with one example configuration there is provided a code coverage analysis apparatus including an interface to receive at least one code coverage table produced using the methods described above. The code coverage analysis apparatus also includes evaluation circuitry to evaluate each received code coverage table to determine whether the testing of the code sequence complies with at least one MC/DC code coverage criterion for an associated decision.

Particular examples will now be described with reference to the figures.

As discussed, it is often useful to be able to test a sequence of code under the influence of one or more test stimuli. FIG. 1 shows a system for carrying out such a test on an input code sequence 2 under the influence of test stimuli 4. In the example shown, the code sequence 2 is tested within a target system 6, which is the system on which the code sequence would be run under normal circumstances. In some examples, the target system 6 is a modified version of the system on which the code sequence would be run under normal conditions. For example, the system could be modified to generate sensor readings on the basis of the test stimuli. The target system 6 comprises target processing circuitry 8, in communication with a register bank 10 and memory 12. The target system 6—and in particular the target processing circuitry 8—takes the code sequence 2 and the test stimuli 4 as inputs. The test stimuli 4 are a collection of inputs to the target processing circuitry 8 intended to simulate one or more example scenarios that might be encountered when the code is run under normal circumstances (e.g. outside of the test).

During testing of the code sequence 2, the target processing circuitry 8 creates, in memory 12, one or more code coverage tables 14 for each of one or more decisions in the code sequence. The code coverage tables 14 are populated as decisions in the code sequence 2 are evaluated, with the target processing circuitry 8 generating, in a register of the register bank 10, a bitstring for each evaluated decision, the bitstring identifying an entry in a code coverage table 14 and being used as an index for the table.

Once testing of the code sequence 2 is complete, the code coverage table or tables 14 can be output to a code coverage analyser 16. The code coverage analyser in this example includes an interface 18 for communicating with the target system 6 (for example, to receive the one or more code coverage tables 14 from memory 12) and evaluation circuitry 20 for evaluating the level of compliance of the test of the code sequence 2 with one or more code coverage criteria. Whilst in one implementation the code coverage analyser 16 could be a dedicated piece of hardware, in an alternative implementation the code coverage analyser is implemented by software running on a general purpose processing system.

As shown, the present technique generates code coverage tables 14 on the target system, rather than outputting an entire trace recorded while executing the code sequence 2. In this way, the processing power and space in memory required to capture an entire trace, output it and analyse it in post-processing are reduced by storing the necessary information for evaluating code coverage in an efficient way in code coverage tables 14 in memory 12 of the target system 6.

Figure 2:
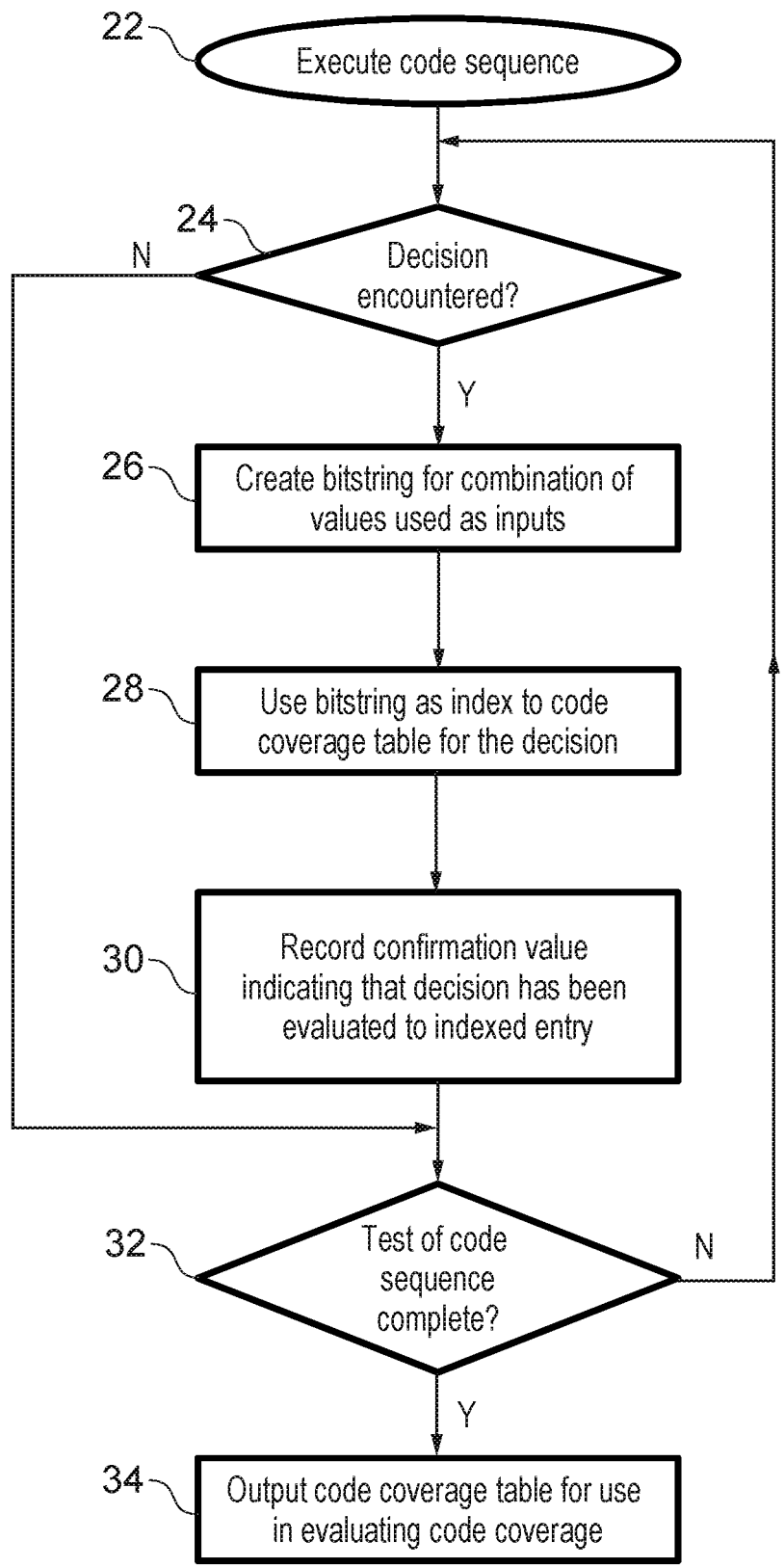
FIG. 2 is a flow diagram showing a method of populating a code coverage table according to some examples of the present technique.

In the examples described in the present application, a code sequence 2 comprises one or more decisions, each made up of one or more conditions. FIG. 2 is a flow diagram demonstrating an example method of testing such a code sequence 2 and populating one or more code coverage tables 14 in the process.

The method depicted in FIG. 2 starts at step 22, in which execution of the code sequence 2 is initiated. In step 24, the target processing circuitry 8 determines whether or not a decision has been encountered. If the answer at this step is no, the target processing circuitry 8 proceeds to step 32. On the other hand, if the answer at step 24 is yes, the method proceeds to step 26, in which the conditions used in evaluating the decision are evaluated, and a bitstring is generated for the specific combination of values used as inputs (conditions) in evaluating the decision. The conditions typically take values of either true (1) or false (0), and so the "value" of a condition is typically either "1" or "0" depending on whether it is true or false. The bitstring comprises a bit for each condition used, where each position in the bitstring is associated with a different one of the conditions, and the value of the bit in this position represents the value of that condition used in the evaluation of the decision. For example, if the conditions A=true, B=false and C=false were used to evaluate a decision, the bitstring could be (1 0 0).

In step 28, the bitstring generated in the previous step is used as an index to identify an entry in the respective code coverage table 14. For example, the bitstring (1 0 0) may correspond to entry 4 in the table. The entry identified in the code coverage table 14 is the entry corresponding to the particular combination of values of the conditions used to evaluate the decision.

In step 30, once the target processing system has evaluated the result of the decision, the target processing circuitry 8 records a confirmation value to the entry identified by the bitstring in step 28. The confirmation value is a value indicating that the decision has been evaluated for the combination of values of the conditions associated with that entry and may, for example, be a value of logic 1 recorded to that entry in the code coverage table 14.

Figure 3:
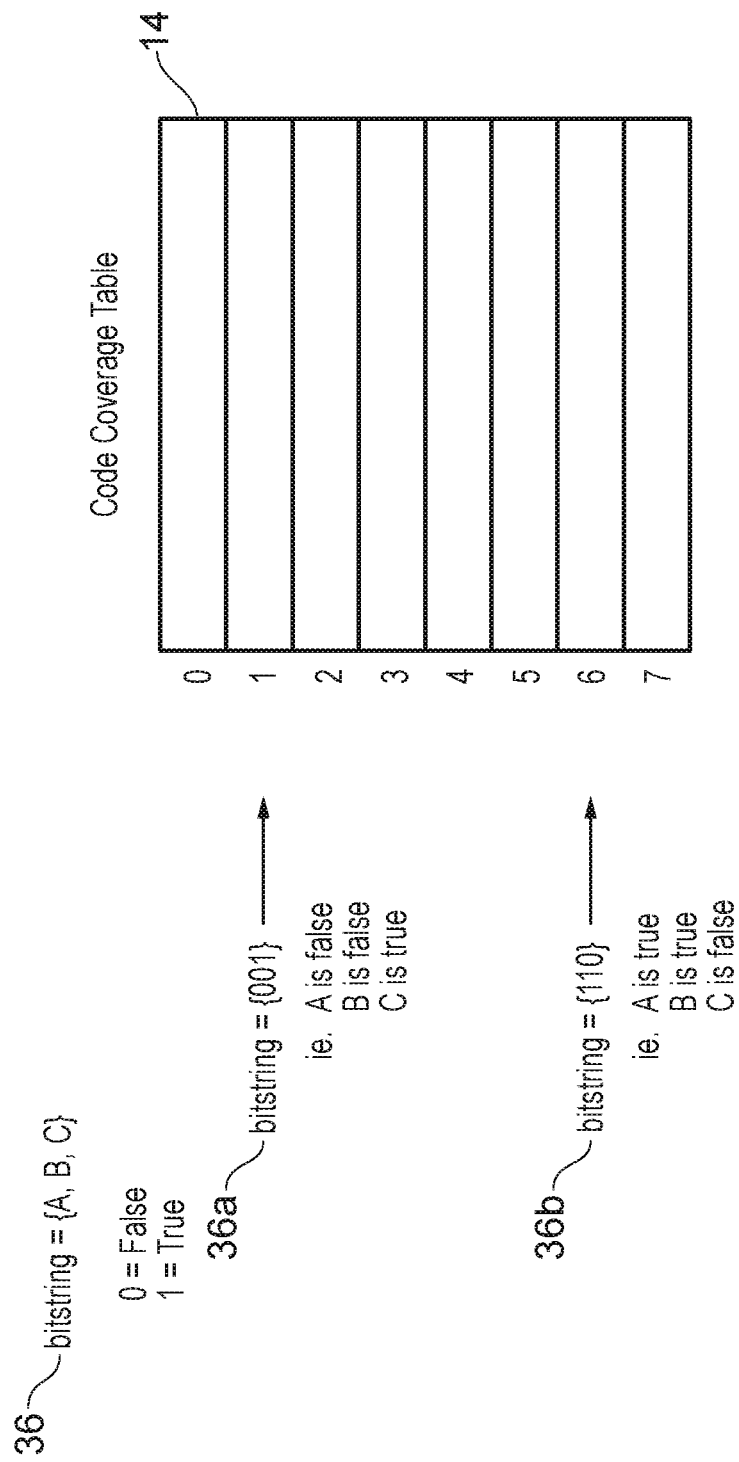
FIG. 3 shows an example of using a bitstring to identify an entry in a code coverage table, according to some examples of the present technique.

In step 32, the target processing circuitry 8 determines whether the test of the code sequence 2 is complete. If the test is not complete, the method returns to step 24 and waits for a decision to be encountered. On the other hand, if the test is complete, the method passes to step 34 and the code coverage tables are output for use in evaluating code coverage. FIG. 3 shows an example of a code coverage table 14 being indexed with bitstrings 36 corresponding to particular combinations of three conditions A, B and C forming a decision. Each bitstring 36 in this example comprises three bits—bit 0 representing the value of condition A, bit 1 representing the value of condition B and bit 2 representing the value of condition C. A value of logic 0 in a particular position of the bitstring 36 indicates that the corresponding condition has been evaluated as false (or that it has not been evaluated at all, due to short-circuiting), and a value of logic 1 indicates that it has been evaluated as true.

In the example of FIG. 3, the decision has been evaluated for two combinations of conditions. In a first example, the combination A=B=false and C=true has been evaluated. A bitstring 36a of (0 0 1) has thus been generated and used to identify the second entry (entry 1) in the code coverage table 14. In a second example, the combination A=B=true and C=false has been evaluated, leading to the creation of a bitstring 36b (1 1 0). This bitstring indexes the seventh entry (entry 6) of the code coverage table 14. Thus, the bitstring 36 provides an efficient technique for indexing the code coverage table 14.

Figure 4:
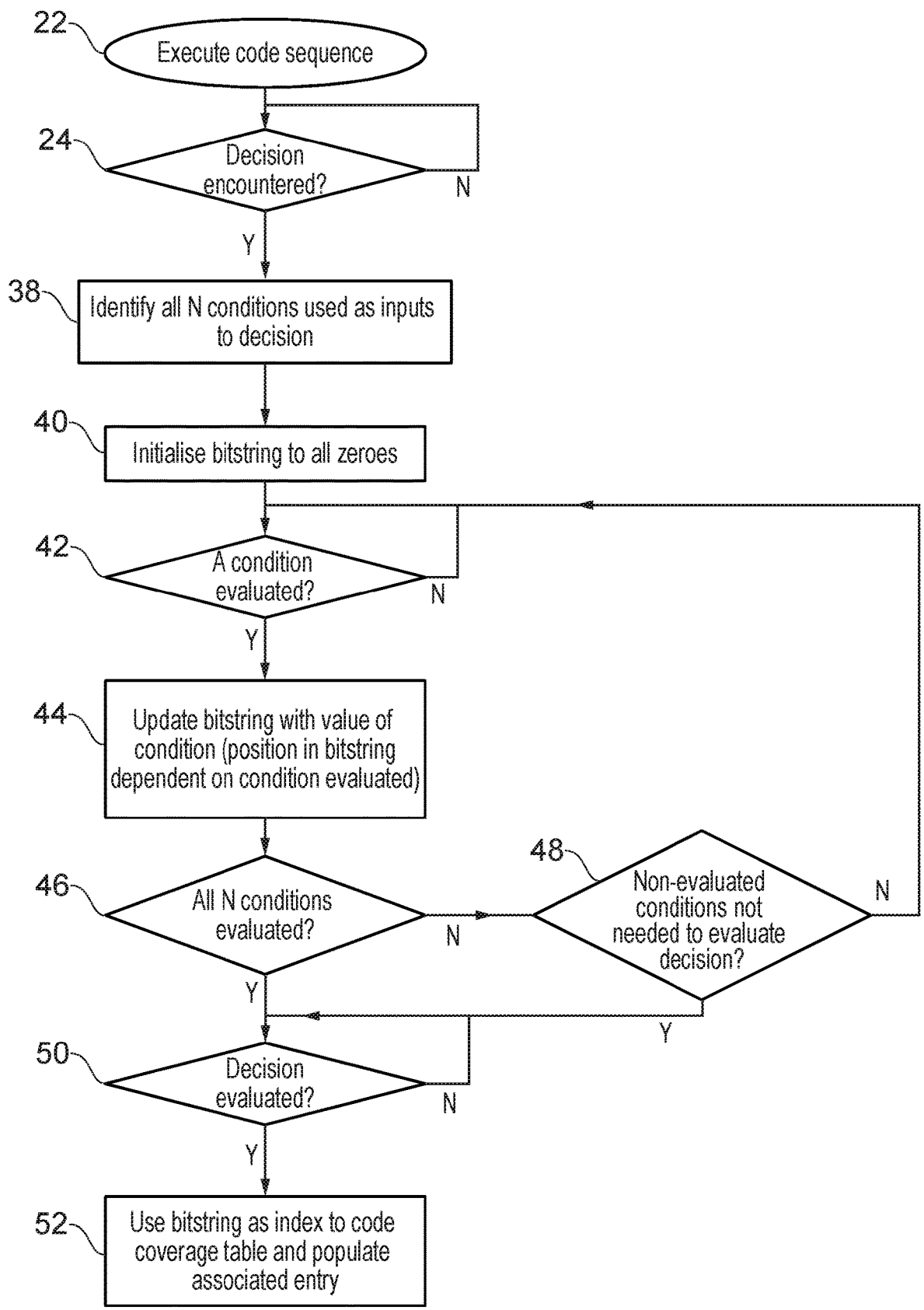
FIG. 4 is a flow diagram showing how a bitstring can be created to identify an entry in a code coverage table, according to some examples of the present technique.

FIG. 4 is a flow diagram showing an example of a method of populating a particular entry of the code coverage table 14. As in FIG. 2, the method begins in steps 22 and 24 with executing the code sequence 2, and determining whether a decision has been encountered during execution of the code sequence 2. When a decision has been encountered, the method proceeds to step 38; if a decision has not been encountered, the target processing circuitry 8 waits until one has been encountered before proceeding to step 38. In step 38, the target processing circuitry 8 identifies all N conditions used as inputs to the decision (i.e. A, B, C, etc.), and in step 40, the target processing circuitry 8 initialises the bitstring 36—stored in the register bank 10—to all zeroes. In step 42, the target processing circuitry 8 determines whether one of the conditions identified in step 38 has been evaluated. If the answer at this step is yes, the method proceeds to step 44; if not, the method remains at step 42 until a condition is evaluated. In step 44, the bitstring 36 is updated by writing, to the associated position in the bitstring 36, the value of the evaluated condition.

In step 46, the target processing circuitry 8 determines whether or not all N of the conditions identified in step 38 have been evaluated, and if not proceeds to step 48, in which it is determined whether or not the non-evaluated conditions are needed to evaluate the decision, given the values of the conditions that have already been evaluated. This step acknowledges that it is not always necessary to have evaluated all N conditions in order to evaluate the decision, and to determine compliance with code coverage criteria. For example, as allowed by the DO-178C Standard definition of MC/DC, the fourth MC/DC condition can be demonstrated to be satisfied for a particular condition in a decision by varying just that condition while holding fixed all other possible conditions that could affect the outcome. For example, as discussed later with respect to FIG. 5 and FIGS. 7 to 9, short-circuiting may mean that some combinations of conditions in a decision are never seen (for example, in the decision (A && B) II C, where "&&" represents "AND", the combination A=false and B=true is never observed, since if A=false, there is no need to evaluate B—indeed, another standard, the ANSI/ISO C Standard actually forbids evaluating B in this situation. This is discussed in more detail below). In these examples, when the answer in step 48 is yes, the target processing circuitry 8 assumes a default value for any conditions not evaluated (for example, these values may be assumed to be "false" and the value of the bit at that position of the bitstring 36 remains unchanged.) On the other hand, if the answer at step 48 is no, the method returns to step 42 and waits for a further condition to be evaluated.

Following a determination of "yes" in either step 46 or step 48, the method continues to step 50, in which the target processing circuitry 8 determines whether the decision has been evaluated. If the answer is no, the method remains at step 50 until the target processing circuitry evaluates the decision; if the answer is yes, the method proceeds to step 52, in which the generated bitstring 36 is used as an index to the code coverage table 14 corresponding to the evaluated decision, as shown in FIG. 3.

Figure 5:
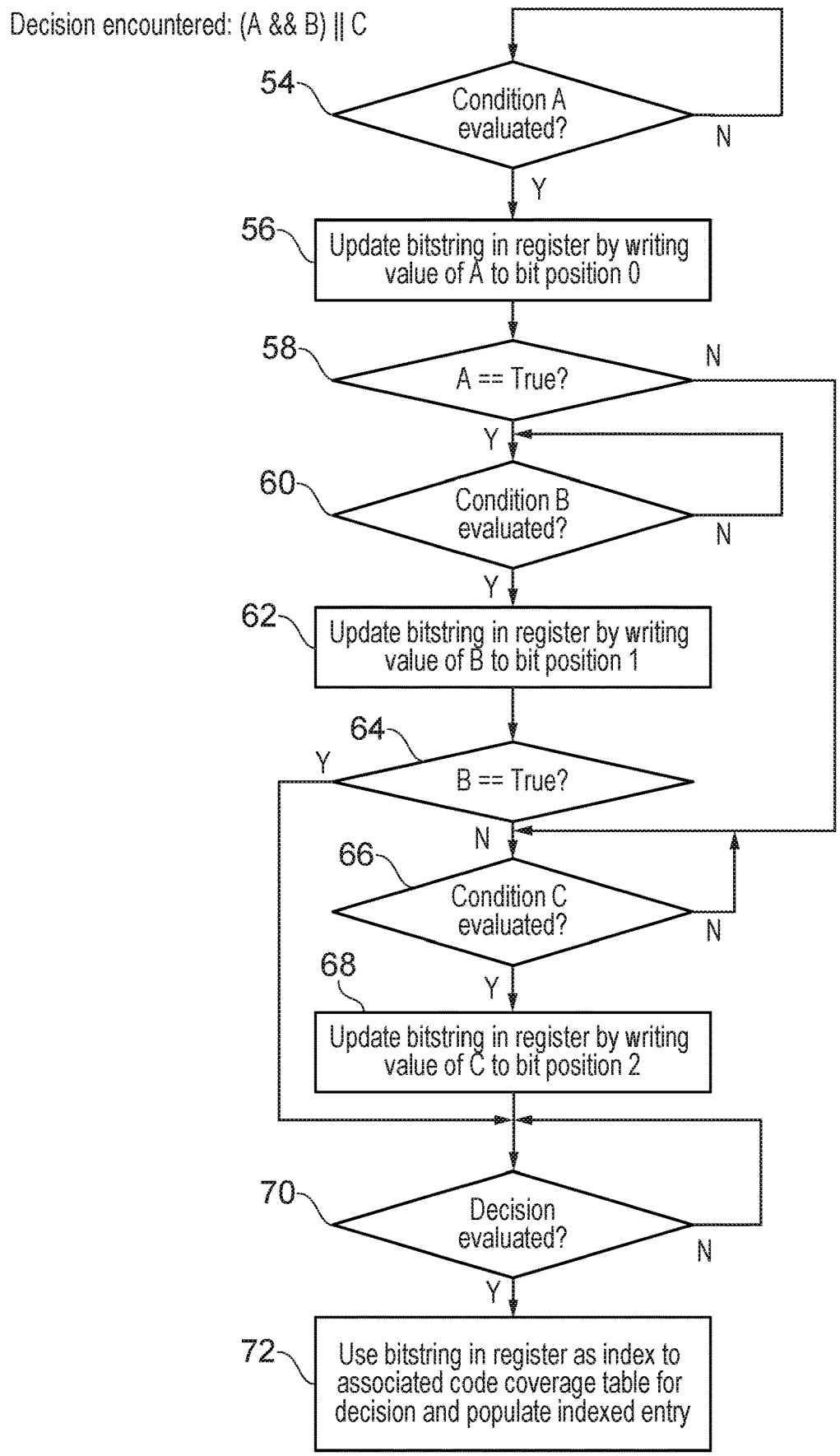
FIG. 5 is a flow diagram showing how an example decision can be tested according to some examples of the present technique.

FIG. 5 shows a more detailed example of a method of populating an entry of the code coverage table 14 for a particular example of a decision—(A && B)|| C.

The method of FIG. 5 starts at step 54, in which the target processing circuitry 8 determines whether or not condition A has been evaluated. When it has been evaluated, the method proceeds to step 56, in which the value of the bit in position 0 of the bitstring 36 is updated by writing the value of A to that position. In this method, it is assumed that the bitstring 36 has been initialised to, for example, all zeroes, as in step 40 in FIG. 4. In step 58, the target processing circuitry determines whether the value of A was evaluated to be true. If not (that is, if A is false), the method skips ahead to step 66, skipping evaluation of condition B. This is an example of short-circuiting, in which one condition (B) is not evaluated since, due to the value of one or more preceding values (A), the value of that condition has no effect on the outcome of the decision. In this particular example, if A is false, then the value of (A && B) will be false regardless of the value of B, so there is no need for B to be evaluated. The target processing circuitry 8 therefore skips straight to the evaluation of condition C and the value of the bit in position 1 of the bitstring 36 is left at its default value (logic 0, for example).

On the other hand, if A is evaluated as true, the method proceeds from step 58 to step 60, in which it is determined whether or not condition B has been evaluated. When B has been evaluated, the bitstring 36 is updated in step 62 by writing the value of B to bit position 1 in the bitstring 36. In step 64, it is determined whether the value evaluated for B was true. If not (i.e. the value of B is false), the method again short-circuits and jumps to step 70, skipping the evaluation of C. This is because if both A and B are evaluated to true (which is the case if B is evaluated to true, since B would not be evaluated at all if A was false), then the overall result of the decision will be true regardless of the value of C (that is, (A && B)∥ C=(true && true)∥ C=true∥ C=true, regardless of whether C is true or false).

On the other hand, if B is evaluated as false, the method instead passes to step 66, in which it is determined whether or not the value of condition C has been evaluated. When condition C has been evaluated, the method proceeds to step 68, in which the bitstring 36 is updated by writing the value of C to position 2 in the bitstring 36.

In step 70, it is determined whether the decision has been evaluated. When it has, the method proceeds to step 72, in which the generated bitstring 36 is used as an index to the associated code coverage table 14, and the identified entry in the table is populated.

The method of FIG. 5 can also be represented in pseudo-code, as demonstrated below, in which semi-colons indicate that the following text is a comment and text in the form of "label" is used to indicate a place to which the code may jump from elsewhere.

```
Using the decision (A && B) ∥ C
-------
Begin
-------
; The bits that record the result of each condition as evaluated
MOV rBitString, #0
; Source of a single bit
MOV rOne, #1
; Condition 0; is rA true (represented by a value of 1)?
CMP rA, #1
BFI.EQ rBitString, rOne, #0, #1   ; set Bit 0 (for condition 0) if rA is Equal (EQ)
B.NE .test_OR_C                    ; it was false, jump straight to C
; Condition 1; is rB true?
CMP rB, #1
BFI.EQ rBitString, rOne, #1, #1   ; set Bit 1 (for condition 1) if rB == 1
B.EQ .decision_evaluated           ; (A && B)
; Fall through to test C
.test_OR_C
; Condition 2: is rC true?
CMP rC, #1
BFI.EQ rBitString, rOne, #2, #1   ; set Bit 2 (for condition 2) if rC == 1
.decision evaluated
; Decision about to be taken
LDR rTable, =<address_of_mc_dc_coverage_table_for_this_decision>
STRB rOne, [rTable, rBitString]   ; store a 1 into rTable [rBitString]
B.EQ .code_for_decision_evaluates_true
B.NE .code_for_decision_evaluates_false
-----
End
```

In the above pseudocode, text in bold indicates code added to the original sequence 2 by a compiler, in order to cause the code coverage tables 14 to be populated as the instrumented code is run.

Figure 6:
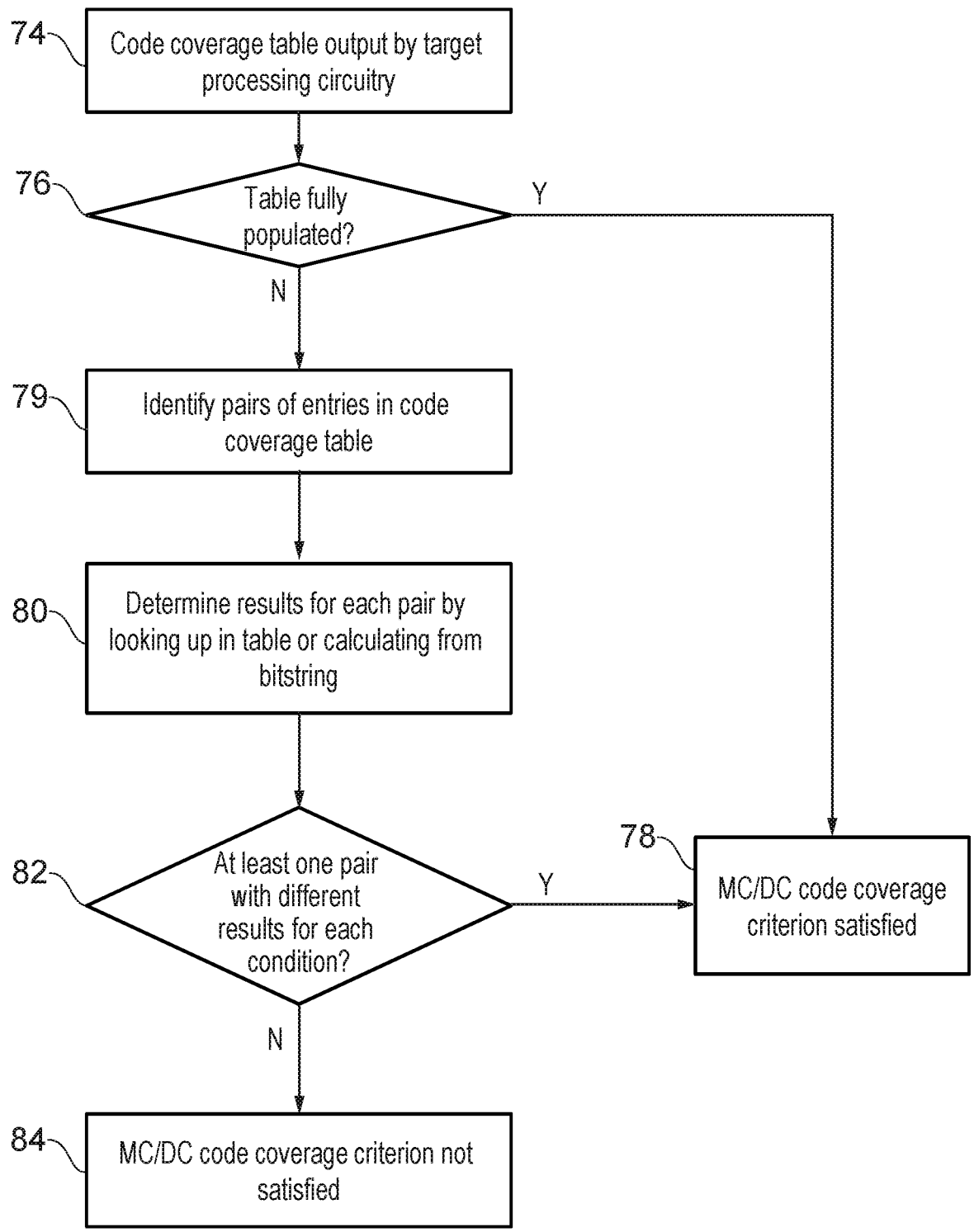
FIG. 6 is a flow diagram showing an example method for evaluating whether an MC/DC criterion is satisfied using a code coverage table output by target processing circuitry.

Returning to the figures, FIG. 6 shows an example of a method for evaluating code coverage tables 14, once they have been output by the target system 6. Starting in step 74, a code coverage table 14 is output to a code coverage analyser 16 by the target system 6. Step 76 sees the code coverage analyser 16 determine whether or not the table 14 is fully populated (that is, a result has been observed for each combination of values for the conditions). If it is determined that the table is fully populated, the method proceeds straight to step 78 and the code coverage analyser 16 determines that the MC/DC code coverage criterion is satisfied. In this example, the criterion tested is assumed to be the fourth criterion of MC/DC, however a similar method may also be used for other criteria. If, in step 76, it is determined that the table is not fully populated, the code coverage analyser 16 seeks to identify, in step 79, "pairs" of entries in the code coverage table 14.

A pair of entries, according to the present technique, is a set of two entries in the code coverage table 14 identifying combinations values of conditions: that have been observed, and in which one condition is varied while holding fixed all other possible conditions that could affect the outcome. For example, for the decision (A && B)∥ C, if entry 0 (A=B=C=0) and entry 1 (A=B=0 and C=1) are both populated, these entries form a pair. This can be seen in FIG. 8, which will be described in due course.

It is not necessary for all of the conditions of an entry to have been evaluated for that entry to form part of a pair. If it allows a pair to be formed, an unknown condition in an entry can be assumed to take either value (true or false). This will be discussed in more detail when describing FIG. 8.

Returning to FIG. 6, once pairs have been identified in the code coverage table 14, the code coverage analyser 16 determines, in step 80, the result of each decision making up each pair. If the entry comprises a field for the result of the decision, this determination may be performed by looking up the result in the table 14, but if the table does not store the results of the decisions, the result can be determined in post-processing by calculating it from the bitstring. For example, it the decision is (A && B)||C and the bitstring is (0 0 0), the result can be calculated by inputting A=B=C=0=false into the decision.

Following determination of the results of each entry in each pair, the method proceeds to step 82, in which the code coverage analyser 16 determines whether there is at least one pair of entries with different results (i.e. one has a result of true and the other has a result of false) for each condition. If yes, the code coverage analyser 16 determines that the MC/DC code coverage criterion is satisfied (step 78); if no, the MC/DC code coverage criterion has not been satisfied (step 84).

FIG. 7 shows an example of a code coverage table 14, demonstrating the values that each field can take in each entry for the example decision (A && B)|| C. The table 14 shown in this figure has two fields for each entry—an "observed" field 86 and a "result" field 88. The observed field 86 stores an indication of whether or not the associated decision has been evaluated for the combination of values of conditions associated with that entry, where a value of logic 1 (the confirmation value, in this case) identifies that the associated combination has been seen, and a value of logic 0 indicates that it has not. This is the only field required for assessment of MC/DC, however the result field 88 is useful as it avoids the need for post-processing to determine the result for each entry. The result field 88 stores the result of the decision for that combination of values of the conditions, provided that the corresponding combination has been observed (otherwise the result defaults to logic 0).

As the table 14 shows, the observed field 86 for each entry can take a value of either 1 or 0, with the exception of entries 2, 3 and 7. These entries can only have a value of 0 in the observed field 86, since it is not possible to observe these combinations of conditions. For example, taking entry 2, observing this combination of values of the conditions would require the target processing circuitry 8 to evaluate the conditions as A=false, B=true and C=false. However, as described above in relation to FIG. 5, short-circuiting in the code sequence means that if A is false, B is not evaluated. Thus, any entry that requires A=false and B=true cannot be observed (e.g. entry 3). Entry 0 (A=B=C=false) can be observed, however, even though the target processing circuitry 8 would not evaluate B once A is determined to be false; this is because the target processing circuitry assumes that any unknown condition takes the default value—which in this example is logic 0—in creating the bitstring 36. It is also possible, however, that the default value is taken to be logic 1 rather than logic 0; in this case, the combination of conditions corresponding to entries 2, 3 and 7 would be considered observable, while the combinations for entries 0, 1 and 5 would not. Similarly to entries 2 and 3, entry 7 (A=B=C=true) cannot be observed, since if A and B are true, C is not evaluated. In all three of these entries (2, 3 and 7), the result 88 is set as 0, which is the default value for this field. However, it is possible to instead set 1 as the default value, in which case all three of these entries would be set to 1.

The remaining entries (0, 1, 4, 5 and 6) can take either value in the observed field 86. In the result field 88, if the value in the observed field 86 for that entry is logic 0, the value in the result field 88 will be the default value (logic 0 in this example). However, if the value in the observed field 86 is logic 1, the value in the result field 88 will be the result of the decision for that combination of values of the conditions. For example, the value in the result field fore entries 0 and 4 will be logic 0 if they are observed (or, indeed, if they are not) and the values in the result field 88 for entries 1, 5 and 6 will be logic 1 if they are observed.

FIG. 8 shows a particular example of a completed code coverage table 14 for the decision (A && B)||C, which demonstrates that the MC/DC code coverage criterion has been satisfied. In this example, not all of the combinations of values of the conditions have been observed (entries 2, 3, 5 and 7 have not been observed), but the code coverage table 14 still demonstrates that the fourth MC/DC code coverage criterion has been satisfied. As discussed, the fourth criterion can be shown to be satisfied for each condition by varying just that condition while holding fixed all other possible conditions that could affect the outcome. Providing this is shown to be satisfied for each condition, the fourth criterion is satisfied. Using the code coverage tables 14 of the present technique, this is shown if there exists, in the completed table, at least one pair of entries for each condition in which the result differs between the two entries.

In the example of FIG. 8, entries 0 (A=B=C=0) and 6 (A=B=1 and C=0) form a pair that demonstrates that condition A independently affects the result of the decision. In this case, condition B in entry 0—which is actually an unknown since B is not evaluated when A is false—is assumed to take the value of logic 1 for the sake of creating the pair. This is permitted since the value of B in this case does not affect the result of the decision. For condition B, entries 4 (A=1 and B=C=0) and 6 (A=B=1 and C=0) form a pair that demonstrates that B independently affects the result of the decision, and for condition C, entries 0 (A=B=C=0) and 1 (A=B=0 and C=1) form a pair that demonstrates that this condition independently affects the result of the decision. Thus, since all three conditions A, B and C have been shown to independently affect the result of the decision, the table 14 in FIG. 8 demonstrates that the fourth criterion of MC/DC has been satisfied.

It is particularly useful to be able to demonstrate that the fourth criterion is satisfied without requiring all combinations of values of the conditions to have been observed, since this reduces the likelihood that the test suite will have to be repeated or extended in order to demonstrate code coverage. It also allows decisions such as (A && B)|| C, where some combinations of values of the conditions cannot be observed, to be tested.

As a contrasting example, FIG. 9 shows an incomplete code coverage table 14 that does not demonstrate compliance with the fourth criterion of MC/DC. In this example, a pair has been found to demonstrate that condition C independently affects the outcome of the decision (entries 0 and 1), but no suitable pairs exist for conditions A and B. The fourth condition of MC/DC has not, therefore, been shown to be satisfied.

FIG. 10 shows an example of a code coverage table 14 with an additional field. In addition to the observed 86 and result 88 fields, the code coverage table 14 shown in FIG. 10 also includes a "conditions taking default value" field 90. This field stores, for each entry, an indication of whether any of the conditions have been assumed to take a default value in creating the bitstring 36 to index the table 14. This field 90 therefore provides an indication of any conditions that were not evaluated due to short-circuiting in the code sequence 2.

FIG. 11 shows an example of a code coverage table 14 similar to that in FIG. 10, but fully populated for an example decision (A && B)|| C.

FIG. 11 shows, for all observable combinations of values of the conditions, a depiction 92 of the evaluated values of the conditions, in which a value of false is represented as "F", a value of true is represented as "T", and an unknown value is represented as an "X". For example, for entry 1, the evaluated values are recorded as FXF, indicating that A and C have been evaluated to equal false and B has not been evaluated. In the table 14, any unknown conditions, assumed to take the default value (logic 0, in this case), are indicated in the conditions taking default value field 90 with a logic 1 in the corresponding bit position. For each entry, the conditions taking default value field 90 stores a three-bit value, with zeroes in each position except for any position corresponding to a condition that took the default value for that entry; for example, for entry 0 the value in this field 90 is 010, indicating that condition B took the default value.

By including a field 90 indicating which conditions were assumed to take the default value in populating the table, the analysis of compliance with code coverage performed by the code coverage analyser 16 can be performed more efficiently. However, it is not a requirement for the table to include this field—the code coverage analyser 16 can alternatively determine any conditions that were assumed to take the default value in post-processing.

In the example of FIG. 11, the values in the conditions taking default value field 90 are each initialised to 111, and a "0" is written to each position when the corresponding condition has been evaluated for that entry.

Figure 12:
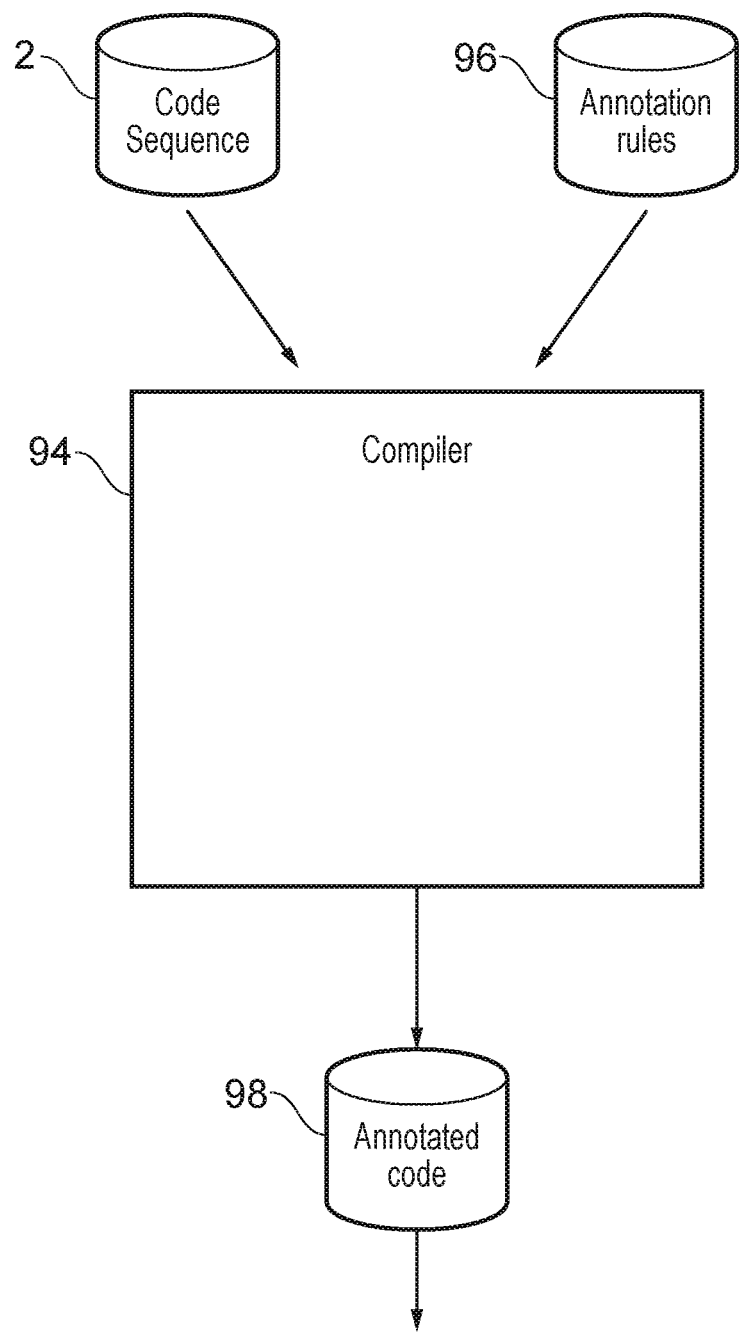
FIG. 12 shows an example of a compilation technique according to some examples of the present technique.

FIG. 12 shows an example of a compiler 94 according to some examples of the present technique. The compiler 94 demonstrated in FIG. 12 takes as inputs the code sequence 2 and a set of instrumentation rules 96. The instrumentation rules 96 instruct the compiler 94 in how to instrument the code sequence 2 to provide an instrumented code sequence 98 to be run on the target system 6 to facilitate the population of the code coverage table or tables 14 during testing of the code sequence 2. To generate the instrumented code sequence 98, the compiler 94 augments the code sequence 2 with additional instructions to cause the target processing circuitry 8 to create, within the register bank 10, the bitstring 36 for each combination of values of the conditions for a particular decision, to use the bitstring 36 as an index to the code coverage table 14 to identify the entry associated with the combination of values evaluated for the conditions, and to record the confirmation value (a value indicating that that combination of values of the conditions has been tested) in that entry of the table 14. In some examples, the compiler 94 may also, under the influence of the instrumentation rules 96, instrument the code sequence 2 with additional instructions to create, in memory, a code coverage table 14 for each decision to be tested; however, in alternative examples, the tables 14 are created in advance of the instrumented code 98 being run on the target processing circuitry 8.

Once it has been generated, the instrumented code 98 is run on the target processing circuitry 8 in place of the original code sequence 2. An efficient way of adapting a test of a code sequence 2 to generate the code coverage tables 14 of the present technique is therefore shown.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the technique have been described in detail herein with reference to the accompanying drawings, it is to be understood that the technique is not limited to those precise embodiments, and that various changes and modifications can be effected therein by one skilled in the art without departing from the scope of the technique as defined by the appended claims.

The invention claimed is:

1. A method of generating code coverage information during testing of a code sequence, wherein during execution of the code sequence a plurality of decisions of the code sequence are evaluated in order to determine a plurality of decision results, where each decision has as inputs one or more conditions, the method comprising:
   executing, by the processing circuitry, instructions to create in memory, for at least one of the plurality of decisions, an associated code coverage table to store the code coverage information for that decision,
   wherein the code coverage table comprises a plurality of entries, each associated with a given combination of values of the one or more conditions used as inputs when evaluating the associated decision and the values can each take one of two possible values and each code coverage table comprises at least $2^N$ entries where N is the number of conditions used as inputs for the associated decision, the $2^N$ entries comprising an entry associated with each possible combination of values of the one or more conditions used as inputs when evaluating the associated decision;
   subsequent to creation of the associated code coverage table, executing the code sequence on target processing circuitry under the control of test stimuli, during which the target processing circuitry is caused to edit in memory, for at least one of the plurality of entries wherein:
   during executing the code sequence, each time a decision with an associated code coverage table is evaluated during execution of the code sequence, further causing the target processing circuitry to:
      create, within a storage element, a bitstring comprising N bits, where each position in the bitstring is associated with a specific one of the N conditions used as an input for the decision, and the value at each position in the bitstring identifies which of the two possible values the associated condition was set to in evaluating the decision;
      use the bitstring as an index to the associated code coverage table to identify an entry in the table corresponding to a particular combination of values of the one or more conditions used to evaluate the decision; and
      record, in that entry, a confirmation value to indicate that the decision has been evaluated for the particular combination of values of the one or more conditions associated with that entry; and
   once the testing of the code sequence has completed, outputting each code coverage table for use in evaluating code coverage.

2. The method of claim 1, wherein:
when one of the conditions does not affect the result of the decision, given the value of at least one other condition used in evaluating the decision, a default value is given to that condition when evaluating the decision.

3. The method of claim 2, wherein:
the default value is a logic zero value.

4. The method of claim 1, further comprising:
generating, as the code sequence to be executed, an instrumented code sequence by inserting instructions into an original code sequence to cause the target processing circuitry to perform the create, use and record steps.

5. A non-transitory, computer-readable storage medium storing a compiler program which, when executed on a computer, causes the computer to process an input code sequence with reference to instrumentation rules in order to generate an instrumented code sequence as defined in the method of claim 4.

6. The non-transitory, computer-readable storage medium of claim 5, wherein:
the compiler program is further configured to insert into the code sequence instructions to create in memory, for each of the one or more decisions, the associated code coverage table for that decision.

7. The non-transitory, computer-readable storage medium of claim 5, further providing a linker program which when executed on a computer is arranged to:
take, as an input, the instrumented code sequence; and
provide an executable file based on the instrumented code sequence to the target processing circuitry.

8. The non-transitory, computer-readable storage medium of claim 7, wherein:
one of the compiler program and the linker program is arranged to provide, to the target processing circuitry, an indication that the instrumented code sequence has been instrumented, to thereby cause, in response to the indication, creation in memory, for each of the one or more decisions, of the associated code coverage table for that decision.

9. The method of claim 1, wherein:
each entry in each code coverage table includes at least a first field to store an indication of whether the associated decision has been evaluated for the combination of values of the one or more conditions associated with that entry, wherein said indication is initially set to a first value; and
when the entry is accessed by the target processing circuitry using the bitstring, the method further comprises causing the target processing circuitry to set said indication for that entry to the confirmation value, the confirmation value being different from the first value.

10. The method of claim 9, wherein:
each entry in at least one code coverage table further includes a second field to store the decision result of the associated decision evaluated for the combination of values of the one or more conditions associated with that entry.

11. The method of claim 1, wherein:
the storage element is a register of a register bank accessible to the processing circuitry when executing instructions.

12. The method of claim 1, further comprising:
evaluating each output code coverage table to determine whether the testing of the code sequence complies with at least one Modified Condition/Decision Coverage (MC/DC) code coverage criterion for the associated decision.

13. The method of claim 12, wherein:
the at least one MC/DC code coverage criterion requires that each condition serving as an input to the associated decision has been shown to independently affect the outcome of that associated decision.

14. The method of claim 12, wherein:
the step of evaluating comprises determining whether every entry in the code coverage table for the associated decision stores said confirmation value.

15. The method of claim 14, wherein the step of evaluating further comprises:
when it is determined that every entry in the code coverage table for each decision stores said confirmation value, concluding that the testing of the code sequence does comply with the at least one MC/DC code coverage criterion for the associated decision.

16. The method of claim 15, wherein when it is determined that one or more entries in the code coverage table do not include said confirmation value, the step of evaluating further includes:
seeking to identify, for each condition, at least one pair of entries including said confirmation value, wherein each pair of entries comprises two entries for which the value of the corresponding condition differs and the values of all other conditions that affect the decision result of the associated decision are held constant;
determining, for each pair of entries, whether the decision result of the associated decision differs; and
when it is determined that the decision result of the associated decision differs for at least one pair of entries corresponding to each condition, concluding that the testing of the code sequence does comply with the at least one MC/DC code coverage criterion for the associated decision.

17. The method of claim 16, wherein the step of seeking to identify, for each condition, at least one pair of entries further comprises:
for each entry including the confirmation value, determining if any of the one or more other conditions does not affect the result of the decision; and
when considering a candidate pair of entries, ignoring the values of any condition that does not affect the result of the decision in at least one of the entries of the candidate pair.

18. The method of claim 17, wherein the determining if any of the one or more conditions does not affect the result of the decision is performed with reference to knowledge of the decision.

19. The method of claim 17, wherein:
the table further comprises a third field to store, in each entry, an indication of any condition that does not affect the result of the decision for that entry; and
the determining if any of the one or more conditions does not affect the result of the decision is performed with reference to the third field of the table.

20. The method of claim 16, wherein:
each entry in each code coverage table includes at least a first field to store an indication of whether the associated decision has been evaluated for the combination of values of the one or more conditions associated with that entry, wherein said indication is initially set to a first value;
when the entry is accessed by the target processing circuitry using the bitstring, the method further comprises causing the target processing circuitry to set said indication for that entry to the confirmation value, the confirmation value being different from the first value;

each entry in at least one code coverage table further includes a second field to store the decision result of the associated decision evaluated for the combination of values of the one or more conditions associated with that entry; and the step of determining, for each pair of entries, whether the decision result of the associated decision differs includes:

comparing the decision results stored in the second field of each of the pair of entries.

21. The method of claim 16, wherein the step of determining, for each pair of entries, whether the decision result of the associated decision differs includes:

evaluating the decision result of the associated decision for each of the pair of entries based on the corresponding bitstring; and comparing the decision results for the pair of entries.

22. A code coverage analysis apparatus comprising:

an interface to receive at least one code coverage table produced using the method of claim 1 when testing a code sequence; and evaluation circuitry to evaluate each received code coverage table to determine whether the testing of the code sequence complies with at least one Modified Condition/Decision Coverage (MC/DC) code coverage criterion for an associated decision.

23. A non-transitory, computer-readable storage medium storing a code coverage analysis program which, when executed on a computer, causes the computer to:

process at least one code coverage table produced using the method of claim 1 when testing a code sequence; and evaluate each received code coverage table to determine whether the testing of the code sequence complies with at least one Modified Condition/Decision Coverage (MC/DC) code coverage criterion for an associated decision.

* * * * *